(12) United States Patent
Kim

(10) Patent No.: US 12,294,555 B2
(45) Date of Patent: May 6, 2025

(54) METHOD AND APPARATUS FOR MANAGING MESSAGES ON INSTANT MESSAGING APPLICATION

(71) Applicant: LINE Plus Corporation, Seongnam-si (KR)

(72) Inventor: Keumryong Kim, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 4 days.

(21) Appl. No.: 17/873,398

(22) Filed: Jul. 26, 2022

(65) Prior Publication Data

US 2023/0031018 A1    Feb. 2, 2023

(30) Foreign Application Priority Data

Jul. 27, 2021  (KR) .................. 10-2021-0098354

(51) Int. Cl.
| | | |
|---|---|---|
| *G06F 3/048* | (2013.01) | |
| *G06F 3/00* | (2006.01) | |
| *G06F 9/00* | (2018.01) | |
| *G06F 17/00* | (2019.01) | |
| *G06Q 10/10* | (2023.01) | |
| *H04L 51/02* | (2022.01) | |
| *H04L 51/04* | (2022.01) | |
| *H04L 51/224* | (2022.01) | |
| *H04W 4/16* | (2009.01) | |

(52) U.S. Cl.
CPC .............. *H04L 51/02* (2013.01); *H04L 51/04* (2013.01); *H04L 51/224* (2022.05)

(58) Field of Classification Search
CPC ....... H04L 51/02; H04L 51/04; H04L 51/224; H04L 51/216; H04L 67/55
USPC ........................................... 709/206
See application file for complete search history.

(56) References Cited

U.S. PATENT DOCUMENTS

| | | | | |
|---|---|---|---|---|
| 7,010,288 | B2* | 3/2006 | Brown ............ | H04M 1/72451 455/567 |
| 7,231,232 | B2* | 6/2007 | Osann, Jr. .......... | H04M 1/6505 455/567 |
| 8,086,245 | B2* | 12/2011 | Karaoguz ............ | H04W 48/16 455/457 |
| 8,132,112 | B2* | 3/2012 | Li ...................... | G06F 16/9535 709/204 |
| 8,407,603 | B2* | 3/2013 | Christie ............... | G06Q 10/107 715/752 |
| 8,917,849 | B2* | 12/2014 | Weiner ............. | H04M 3/42382 379/207.02 |
| 9,100,809 | B2* | 8/2015 | Olincy .................. | H04W 4/16 |
| 9,106,447 | B2* | 8/2015 | Lee ........................ | G06F 16/48 |
| 9,454,747 | B2* | 9/2016 | Schultz ................ | G06Q 10/10 |

(Continued)

*Primary Examiner* — Jason D Recek
*Assistant Examiner* — Golam Mahmud
(74) *Attorney, Agent, or Firm* — Harness, Dickey & Pierce, P.L.C.

(57) ABSTRACT

Provided is a method for managing messages on an instant messaging application, which is executed by one or more processors of a user terminal. The method may include receiving a new message from another user through a chat room of the instant messaging application, displaying the new message on a display of the user terminal, sending a waiting message to the another user through the chat room, and maintaining the new message as an unread message in response to the sending of the waiting message to the another user.

19 Claims, 10 Drawing Sheets

(56) References Cited

U.S. PATENT DOCUMENTS

| | | | | |
|---|---|---|---|---|
| 11,425,060 | B2* | 8/2022 | Pham | H04L 51/02 |
| 11,587,559 | B2* | 2/2023 | Newendorp | H04N 21/41407 |
| 11,604,561 | B2* | 3/2023 | Deets, Jr. | H04L 51/212 |
| 11,616,829 | B2* | 3/2023 | Choi | H04L 63/10 |
| | | | | 709/206 |
| 11,855,947 | B1* | 12/2023 | Allen | H04L 51/52 |
| 2006/0174207 | A1* | 8/2006 | Deshpande | G06Q 10/107 |
| | | | | 715/758 |
| 2006/0288099 | A1* | 12/2006 | Jefferson | H04L 65/1108 |
| | | | | 709/224 |
| 2007/0250581 | A1* | 10/2007 | Patel | H04L 51/224 |
| | | | | 709/206 |
| 2011/0151842 | A1* | 6/2011 | Olincy | H04W 4/029 |
| | | | | 455/414.1 |
| 2014/0057610 | A1* | 2/2014 | Olincy | H04W 4/16 |
| | | | | 455/414.1 |
| 2014/0120884 | A1* | 5/2014 | Hymel | H04M 3/53333 |
| | | | | 455/413 |
| 2014/0342704 | A1* | 11/2014 | Alam | H04W 4/16 |
| | | | | 455/412.1 |
| 2015/0127755 | A1* | 5/2015 | Roh | H04L 51/234 |
| | | | | 709/206 |
| 2015/0256570 | A1* | 9/2015 | Joon | H04L 65/1069 |
| | | | | 370/261 |
| 2016/0147387 | A1* | 5/2016 | Rahman | G06F 40/258 |
| | | | | 715/752 |
| 2016/0227387 | A1* | 8/2016 | Chiu | H04W 12/06 |
| 2021/0241206 | A1* | 8/2021 | Choi | H04L 51/046 |
| 2022/0103499 | A1* | 3/2022 | Spolnicki | H04L 41/16 |
| 2022/0179665 | A1* | 6/2022 | Rathod | G06F 9/451 |

* cited by examiner

METHOD AND APPARATUS FOR MANAGING MESSAGES ON INSTANT MESSAGING APPLICATION

CROSS-REFERENCE TO RELATED APPLICATION

This application claims priority to Korean Patent Application No. 10-2021-0098354, filed in the Korean Intellectual Property Office on Jul. 27, 2021, the entire contents of which are hereby incorporated by reference.

BACKGROUND

Field

The present disclosure relates to methods and/or apparatuses for managing messages on an instant messaging application, and more particularly, to methods and apparatuses for sending a waiting message and maintaining the new message as an unread message in a situation in which it is not possible to check a received new message or to continue a conversation in response to the new message.

Description of the Related Art

With the proliferation of mobile devices such as smartphones or the like and the development of the Internet, instant messaging applications are widely used on mobile devices. Users of the instant messaging applications on their mobile devices can exchange various messages with other users through chat rooms.

In most instant messaging applications, chat rooms including unread messages are displayed in an easy-to-recognize manner for user convenience. For example, chat rooms including unread messages may be displayed at the top of a chat room list screen, and the number of unread messages may also be displayed.

Meanwhile, in a situation in which the user is not able to check a received new message or to continue a conversation in response to the new message, the user may need to send a message to notify the counterpart of such a situation. In this case, there is a problem in that it is difficult to distinguish the chat room that includes the corresponding message later, because the new message is processed as a read message when the user enters the chat room to send the message. Further, there is a problem in that the user does not actually recognize a new message yet, but it is difficult to recognize the new message later, because the new message is immediately processed as a read message when the user enters the chat room that includes the new message.

SUMMARY

The present disclosure provides methods, non-transitory computer-readable recording mediums storing instructions, and/or apparatuses (e.g., systems) for solving the problems described above.

The present disclosure may be implemented in a variety of ways, including a method, an apparatus (system), or a non-transitory computer-readable storage medium storing instructions.

According to an example embodiment, a method for managing messages on an instant messaging application may be provided. The method may be executed by one or more processors of a user terminal, and may include receiving a new message from another user through a chat room of the instant messaging application, displaying the new message on a display of the user terminal, sending a waiting message to the another user through the chat room, and maintaining the new message as an unread message in response to the sending of the waiting message to the another user.

According to an example embodiment, the method may further include causing the waiting message to be displayed visually differently from a general message on another user terminal associated with another user.

According to an example embodiment, the method may further include causing another user terminal associated with another user to display that the user does not read new message.

According to an example embodiment, the method may further include displaying a chat room list on the display, wherein the sending includes sending the waiting message sent based on a user selecting the chat room included in the chat room list.

According to an example embodiment, the displaying may include displaying the new message on the display in a form of a push notification, and the sending includes sending the waiting message based on a user selecting a waiting message menu displayed together with the push notification.

According to an example embodiment, the sending may include automatically sending the waiting message when the user does not enter the chat room within a first time period.

According to an example embodiment, the sending may include automatically sending the waiting message when a past conversation history with the another user is present.

According to an example embodiment, the method may further include, when the new message is determined as an advertisement message, deactivating the automatically sending the waiting message, and processing the new message as a read message.

According to an example embodiment, the sending may include displaying a plurality of waiting message templates on the display, selecting a waiting message template from among the plurality of waiting message templates by the user, and sending the selected waiting message template to another user in response to the selecting by the user.

According to an example embodiment, the method may further include entering the chat room after receiving the new message, maintaining the new message as an unread message for a second time period from a time of entry into the chat room, and during the second time period, causing another user terminal associated with another user to display that the user does not read new message.

According to an example embodiment, the new message may be a message received after a third time period elapses from a last message in the chat room.

According to an example embodiment, the method may further include entering the chat room before receiving the new message, and in response to a dynamic change of the user terminal, after displaying the new message on the display, being not detected, maintaining the new message as an unread message.

According to an example embodiment, the dynamic change of the user terminal may be detected based on at least one of an image sensor, a gyro sensor, a proximity sensor, a touch sensor, or an illuminance sensor.

According to an example embodiment, the method may further include, when that the new message is determined as an advertisement message, processing the new message as a read message.

According to an example embodiment, the method may further include entering the chat room before receiving the new message, and after displaying the new message on the display, maintaining the new message as an unread message until the user sends a subsequent message in the chat room.

According to an example embodiment, the new message may be a message received after a third time period elapses from a last message in the chat room.

According to an example embodiment, the method may further include entering the chat room before receiving the new message, and processing the new message as a read message in response to the user scrolling a screen displaying a conversation content of the chat room by a ratio or more of a size of the display.

According to an example embodiment, the method for managing messages may further include, in response to determining that the user does not send a subsequent message in the chat room within a fourth time period after sending the waiting message, displaying a guide associated with the new message on the display.

There is provided a non-transitory computer-readable recording medium storing instructions, which when executed by one or more processors, cause a user terminal to perform the aforementioned method.

According to an example embodiment, the user terminal may include a display, a memory, and one or more processors connected to the memory and configured to execute one or more computer-readable programs included in the memory such that the user terminal is configured to receive a new message from another user through a chat room of an instant messaging application, display the new message on the display, send a waiting message to the another user through the chat room, and process the new message as an unread message in response to the waiting message being sent to the another user.

According to some example embodiments, in a situation in which the user is not able to check a received new message or continue a conversation in response to the new message, by sending a waiting message and maintaining the new message as an unread message, it is possible to easily recognize the unchecked or unanswered message(s).

According to some example embodiments, in a situation in which it is not possible to check a received new message or to continue a conversation in response to the new message, the status of the user can be notified to the counterpart by automatically sending a waiting message.

According to some example embodiments, even when the user enters the chat room that includes a new message, when it is determined that the new message was not recognized by the user, the new message may be maintained as an unread message, and thus the user can easily recognize the message in the future, and the counterpart can also be provided with accurate information on whether the user recognizes the message.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail some example embodiments thereof with reference to the accompanying drawings, in which.

DETAILED DESCRIPTION

Figure 1:
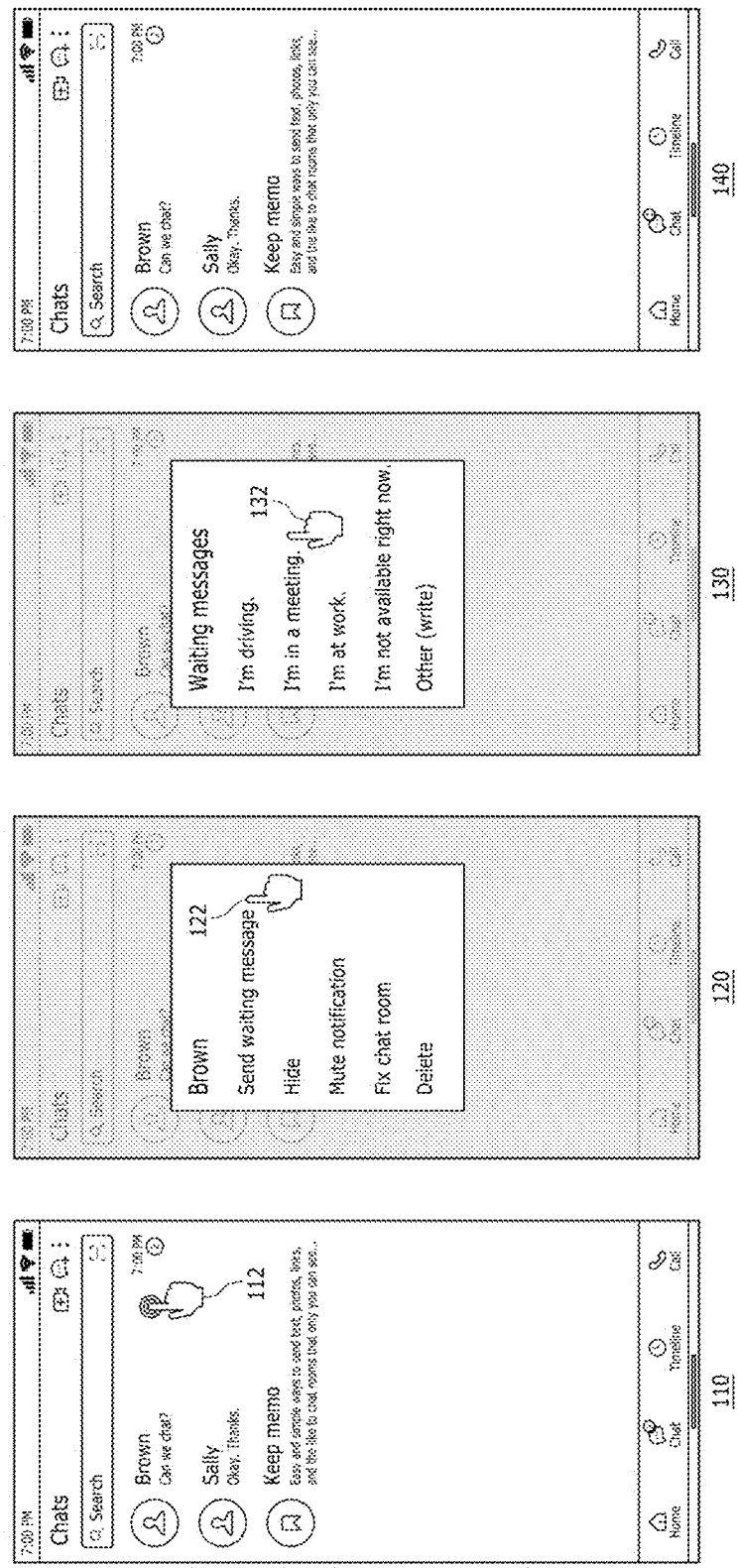
FIG. 1 is a diagram illustrating an example of a method for sending a waiting message according to an example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are assigned the same reference numerals. In addition, in the following description of the example embodiments, duplicate descriptions of the same or corresponding components may be omitted. However, even if descriptions of components are omitted, it is not intended that such components are not included in any example embodiments.

Advantages and features of the disclosed example embodiments and methods of accomplishing the same will be apparent by referring to some example embodiments described below in connection with the accompanying drawings. However, the present disclosure is not limited to the disclosed example embodiments disclosed below, and may be implemented in various forms different from each other, and the present example embodiments are merely provided to make the present disclosure complete, and to fully disclose the scope of the disclosure to those skilled in the art to which the present disclosure pertains.

The terms used herein will be briefly described prior to describing the disclosed example embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the example embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an example embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices (e.g., a combination of a DSP and a microprocessor), a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "chat room" may refer to a virtual space or group which may be generated in an instant messaging application installed on a computing device, and which may be participated by one or more users (or user accounts). For example, one or more user accounts may participate or be included in the chat room and exchange various types of messages, files, and the like. In addition, in the chat room, Voice over Internet Protocol (VoIP) call or VoIP group call function is supported, thus enabling voice calls and/or video calls between user accounts. In addition, one or more bot accounts as well as one or more user accounts may be associated with or included in a chat room, and the bot accounts may perform the same or similar functions as the user accounts in the chat room. The bot accounts or the user accounts may be associated with or included in one or more chat rooms. In addition, the chat room may be a 1:1 chat room that includes only a user account and a bot account, or a group chat room that includes bot accounts.

In the present disclosure, the "user account" may represent an account created and used by a user in an instant messaging application or data related thereto. In addition, the user account of the instant messaging application may refer to a user who uses the instant messaging application. Likewise, a user who uses instant messaging or a user who uses a chat room capable of instant messaging may refer to the user account of the instant application.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, a "waiting message" may refer to a message for notifying the counterpart of a situation in which the user is not able to check a received new message or to continue a conversation in response to the new message. When the waiting message is sent, the new message may be maintained as an unread message. In addition, the waiting message may be displayed visually differently from the general messages.

In the present disclosure, a "display" may refer to any display device associated with a computing device, and for example, it may refer to any display device that is controlled by the computing device, or that can display any information/data provided from the computing device.

In the present disclosure, "each of a plurality of A" may refer to each of all components included in the plurality of A, or may refer to each of some of the components included in a plurality of A.

FIG. 1 is a diagram illustrating an example of a method for managing messages according to an example embodiment. According to an example embodiment, a user terminal associated with a user may receive a new message from another user (e.g., Brown) through a chat room of an instant messaging application. In this example, the new message may be a message other than existing conversation messages that are read by the user, and is a new message that the user has not read yet.

In an example embodiment, the user terminal may display the new message (or information associated with the new message) on the display. For example, in response to receiving the new message, the user terminal may display the new message on the display in a manner of displaying the number of new messages and/or the content of the latest new message in the chat room that includes the new message on the chat room list screen. As another example, the user terminal may display the new message in a form of a push notification notifying the reception of a new message or in a manner of displaying the number of new messages on an icon of the instant messaging application. As still another example, the user terminal may display the content of the new message in the chat room when the user enters the chat room that includes the new message or when the user was already in the chat room before receiving the new message.

As illustrated, the user may send a waiting message to another user (e.g., Brown) through first to fourth operations 110, 120, 130, and 140. The first operation 110 illustrates an example in which the user selects from the chat room list a chat room that includes a counterpart to whom the user wants to send a waiting message. For example, the user may see that two new messages are received from Brown in the chat room list of the instant messaging application, and by a long touch (or right-click, and the like), select (112) a corresponding chat room area to enter a menu related the chat room without entering the chat room.

The second operation 120 is an example in which the user selects a "Send waiting message" menu from the menu related the chat room. As illustrated, the menu related the chat room may include "Send waiting message", "Hide", "Mute notification", "Fix chat room" and "Delete". The user may select (122) "Send waiting message" from the menu related the chat room through a touch input or the like to move to the menu for sending a waiting message to another user (Brown).

The third operation 130 illustrates an example in which the user selects one of waiting message templates displayed on the screen, from the "Send waiting message" menu and sends the waiting message to another user (Brown). As illustrated, the "Send waiting message" menu may include a plurality of waiting message templates and a "direct input" menu for the user to directly write a waiting message. The user may select (132) "In a meeting" from among the plurality of waiting message templates through a touch input or the like to send a waiting message including the phrase "In a meeting" to another user (Brown).

The fourth operation 140 illustrates an example of the chat room list displayed on the display after the user sends the waiting message to another user (Brown). As illustrated, after the user sends the waiting message to another user (Brown), the new messages previously received may still be maintained as unread messages. In addition, on a chat room screen displayed on a user terminal associated with another user (Brown), it may be displayed that the user does not read the new message of another user (Brown).

In an example embodiment, the waiting message may be displayed visually differently from the general messages in another user terminal associated with another user (Brown). For example, the waiting message may be displayed in different message background color, message border, text color, text font, and the like from the general messages. In another example, the waiting message may be displayed as a system message. In still another example, the waiting message may be displayed together with a phrase, a figure, an icon, and the like indicating that it is a waiting message.

Although it is illustrated in FIG. 1 that the user directly selects and sends the waiting message, example embodiments are not limited thereto. For example, the waiting message may be automatically sent when a specific condition is satisfied. In an example embodiment, the waiting message may be automatically sent when the user does not read a new message within a desired (or alternatively, predefined) time. In this case, the waiting message may be automatically sent for all chat rooms, or the waiting message may be automatically sent for a chat room previously specified by the user, or the waiting message may be automatically sent for a chat room satisfying a condition specified by the user. For example, the user may set so as not to automatically send a waiting message to an advertisement message, or may set so as to automatically send a waiting message for a chat room having a past conversation history. In an example embodiment, the waiting message may be automatically sent when a new message is a message received after a desired (or alternatively, predefined) time elapses from the last message in the chat room, or when the new message is a message received after a desired (or alternatively, predefined) time elapses from the last message processed as a read message.

Figure 2:
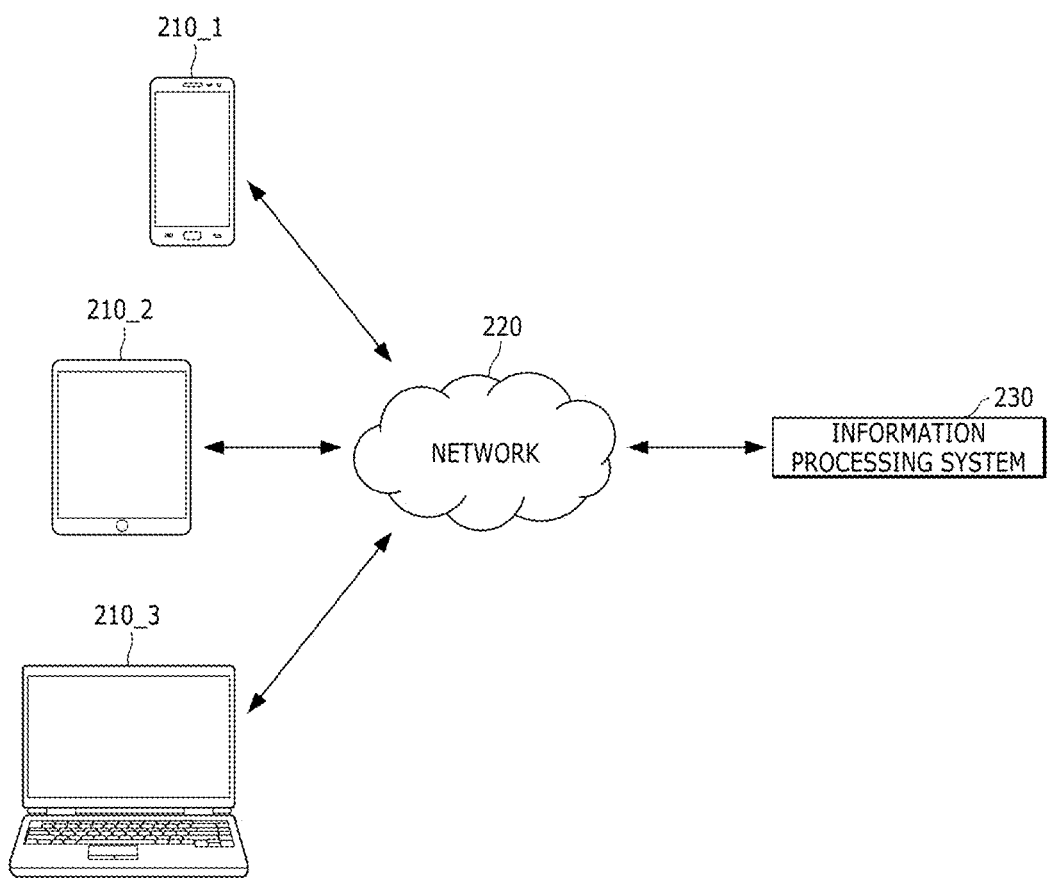
FIG. 2 is a schematic diagram illustrating a configuration in which an information processing system is communicatively connected to a plurality of user terminals according to an example embodiment.

FIG. 2 is a schematic diagram illustrating a configuration in which an information processing system 230 is communicatively connected to a plurality of user terminals 210_1, 210_2, and 210_3 according to an example embodiment. As illustrated, the plurality of user terminals 210_1, 210_2, and 210_3 may be connected to the information processing system 230 that is capable of providing an instant messaging service through a network 220. In this case, the plurality of user terminals 210_1, 210_2, and 210_3 may include terminals of the users receiving the instant messaging service. In an example embodiment, the information processing system 230 may include one or more server devices and/or databases, or one or more distributed computing devices and/or distributed databases based on cloud computing services that can store, provide and execute computer-executable programs (e.g., downloadable applications) and data relating to the provision of instant messaging services and the like.

The instant messaging service provided by the information processing system 230 may be provided to the user through instant messaging applications, web browsers or the like installed in each of the plurality of user terminals 210_1, 210_2, and 210_3. For example, the information processing system 230 may provide information or perform processing corresponding to a request to send a message, a request to send a waiting message, a request to process a message as read, and the like received from the user terminals 210_1, 210_2, and 210_3 through instant messaging applications or the like thereto.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between user terminals 210_1, 210_2, and 210_3, but example embodiments are not limited thereto.

In FIG. 2, a mobile phone terminal 210_1, a tablet terminal 210_2, and a PC terminal 210_3 are illustrated as the examples of the user terminals, but example embodiments are not limited thereto, and the user terminals 210_1, 210_2, and 210_3 may be any computing device that is capable of wired and/or wireless communication and that can be installed with the instant messaging application, the web browser, or the like and execute the same. For example, the user terminal may include an AI speaker, a smart phone, a mobile phone, a navigation, a desktop computer, a notebook computer, a laptop computer, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, and so on. In addition, FIG. 2 illustrates that three user terminals 210_1, 210_2, and 210_3 are in communication with the information processing system 230 through the network 220, but example embodiments are not limited thereto, and a different number of user terminals may be configured to be in communication with the information processing system 230 through the network 220.

According to an example embodiment, the information processing system 230 may receive, from the user terminals 210_1, 210_2, and 210_3, data associated with the request to send a waiting message. Then, the information processing system 230 may send the data associated with the waiting message to the user terminal associated with a recipient of the waiting message, based on the data associated with the received request to send a waiting message. Additionally or alternatively, the information processing system 230 may receive, from the user terminal receiving the new message, data associated with the received request to process a message as read, and provide data associated with the processing of message as read to the user terminal that transmitted the new message, based on the data associated with the received request to process a message as read.

Figure 3:
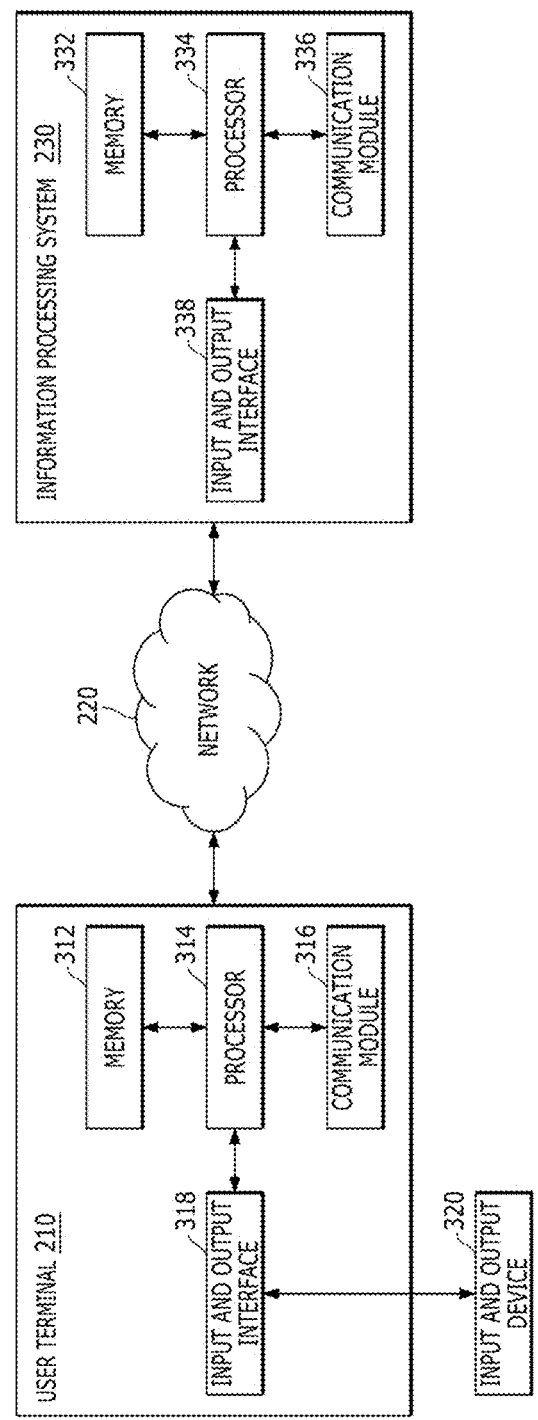
FIG. 3 is a block diagram illustrating an internal configuration of the user terminal and the information processing system according to an example embodiment.

FIG. 3 is a block diagram illustrating an internal configuration of the user terminal 210 and the information processing system 230 according to an example embodiment. The user terminal 210 may refer to any computing device that is capable of executing the instant messaging application, a web browser, or the like and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to an example embodiment, the memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is separate from the memory. In addition, an operating system and at least one program code (e.g., a code for the instant messaging application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program installed by files provided by developers or a file distribution system that distributes an installation file of an application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., data associated with the request to send a waiting message, and the like) generated by the processor 314 of the user terminal 210 according to the program code stored in the recording device such as the memory 312 and the like may be sent to the information processing system 230 through the network 220 under the control of the communication module 316. Conversely, a control signal or a command provided under the control of the processor 334 of the information processing system 230 may be received by the user terminal 210 through the communication module 316 of the user terminal 210 via the communication module 336 and the network 220. For example, the user terminal 210 may receive data and the like associated with a new message from the information processing system 230.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded in the memory 312, a service screen or the like, which is configured with the information and/or data provided by the information processing system 230 or another user terminals, may be displayed on the display through the input and output interface 318. While FIG. 3 illustrates that the input and output device 320 is not included in the user terminal 210, example embodiments are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. In FIG. 3, while the input and output interfaces 318 and 338 are illustrated as the components configured separately from the processors 314 and 334, example embodiments are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. According to an example embodiment, the user terminal 210 may be implemented to include at least a part of the input and output device 320 described above. In addition, the user terminal 210 may further include other components such as a transceiver, a Global Positioning System (GPS) module, a camera, various sensors, a database, and the like. For example, when the user terminal 210 is a smartphone, it may include components generally included in the smartphone. For example, in an implementation, various components such as an acceleration sensor, a gyro sensor, an image sensor, a proximity sensor, a touch sensor, an illuminance sensor, a camera module, various physical buttons, buttons using a touch panel, input and output ports, a vibrator for vibration, and so on may be further included in the user terminal 210. According to an example embodiment, the processor 314 of the user terminal 210 may be configured to operate an instant messaging application that provides a message management service, and the like. In this case, a code associated with the application and/or program may be loaded into the memory 312 of the user terminal 210.

While a program for an instant messaging application or the like that provides a message management service is being operated, the processor 314 may receive text, image, video, audio, and/or action, and so on inputted or selected through the input device such as a camera, a microphone, and so on, that includes a touch screen, a keyboard, an audio sensor and/or an image sensor connected to the input and output interface 318, and store the received text, image, video, audio, and/or action, and so on in the memory 312, or provide the same to the information processing system 230 through the communication module 316 and the network 220. For example, the processor 314 may receive an input of a user that requests to send a waiting message, and provide it to the information processing system 230 through the communication module 316 and the network 220.

The processor 314 of the user terminal 210 may be configured to manage, process, and/or store the information and/or data received from the input and output device 320, another user terminal, the information processing system 230 and/or a plurality of external systems. The information and/or data processed by the processor 314 may be provided to the information processing system 230 through the communication module 316 and the network 220. The processor 314 of the user terminal 210 may send the information and/or data to the input and output device 320 through the input and output interface 318 to output the same. For example, the processor 314 may display the received information and/or data on a screen of the user terminal.

The processor 334 of the information processing system 230 may be configured to manage, process, and/or store information and/or data received from a plurality of user terminals 210 and/or a plurality of external systems. The information and/or data processed by the processor 334 may be provided to the user terminals 210 through the communication module 336 and the network 220.

Figure 4:
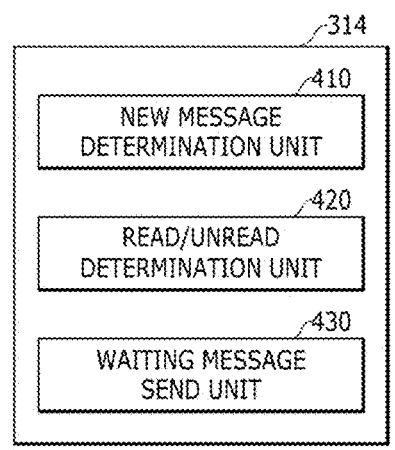
FIG. 4 is a block diagram illustrating an internal configuration of a processor of the user terminal according to an example embodiment.

FIG. 4 is a block diagram illustrating an internal configuration of the processor 314 of the user terminal according to an example embodiment. As illustrated, the processor 314 may include a new message determination unit 410, a read/unread determination unit 420, a waiting message send unit 430, and the like. The processor may receive a new message from another user (or a user terminal associated with another user) through a chat room of the instant messaging application, and display the new message (or information associated with the new message) on a display of the user terminal.

The new message determination unit 410 may determine whether or not the message is a new message. For example, the new message determination unit 410 may determine it to be a new message when it is a message not checked by the user, that is, when it is a new message not yet checked by the user (that is, a message not processed as read). Additionally or alternatively, the new message determination unit 410 may determine whether the new message is a message of a new conversation rather than an answer to an existing conversation. For example, the new message determination unit 410 may determine it to be a message of a new conversation rather than an answer to the existing conversation, when it is a message received after a desired (or alternatively, predefined) time (e.g., 4 hours, and the like) elapses from the first message received in the chat room, or from the last message in the chat room, or when it is a message received after a desired (or alternatively, predefined) time (e.g., 3 hours, and the like) elapses from the last message processed as a read message. Additionally or alternatively, the new message determination unit 410 may determine whether or not the received message is an advertisement message. For example, a message may be determined to be an advertisement message when it includes a phrase such as "advertisement" or "ad" from which it is possible to recognize that it is an advertisement, or when it is a message sent in bulk, a message from a user who is not friend, a message from a commercial account, a message from an account reported for sending advertisement messages, and the like.

According to an example embodiment, even when the condition for automatically sending a waiting message is satisfied (e.g., when the user does not read a message for a desired (or alternatively, predefined) time or when the conditions specified by the user are satisfied, and the like), the waiting message may not be automatically sent when the new message is an answer to an existing conversation (e.g., when it is not a message of a new conversation), an advertisement message, or the like. In addition, even when the condition for maintaining a message as unread message (e.g., a condition that there should be no detection of dynamic change of the user terminal, and the like) is satisfied, an advertisement message and the like may be processed as a read message.

The read/unread determination unit 420 may determine whether to maintain the new message as an unread message or to process it as a read message. According to an example embodiment, when the processor of the user terminal sends the waiting message in response to the user's request to send a waiting message, or when the processor of the user terminal automatically sends the waiting message, the read/unread determination unit 420 may maintain the new message as an unread message.

In an example embodiment, even when the user is available to enter the chat room and check the new message, the read/unread determination unit 420 may maintain the new message as an unread message for a desired (or alternatively, predefined) time from the time when the user enters the chat room, and then determine whether or not to process the new message as read. For example, when it is determined that the user has read the message within a desired (or alternatively, predefined) time (e.g., 10 minutes) (e.g., when it is determined that a subsequent message other than the waiting message is sent, when the chat room screen is continuously displayed for a desired (or alternatively, predefined) time and a dynamic change of the user terminal is detected, when the screen displaying the conversation content of the chat room is scrolled by more than a desired (or alternatively, predefined) ratio (e.g., 30% of the screen size), and the like), the read/unread determination unit 420 may process the new message as a read message. In this case, the read/unread determination unit 420 may send a request to process a new message as read to the information processing system or to another user terminal associated with another user. Meanwhile, when it is determined that the user does not read the message for a desired (or alternatively, predefined) time (e.g., when no subsequent message is sent or only a waiting message is sent, when a dynamic change of the user terminal is not detected, when a user has left the chat room for a desired (or alternatively, predefined) time, when the screen displaying the conversation content of the chat room is scrolled by less than a desired (or alternatively, predefined) ratio, and the like), the read/unread determination unit 420 may maintain the new message as an unread message.

Additionally or alternatively, the read/unread determination unit 420 may temporarily process a new message as a read message only on the user terminal at the time of the user's entry into the chat room, while maintaining the new message as an unread message on another user terminal associated with another user for a desired (or alternatively, predefined) time (that is, a request to process a message as read is not sent to the information processing system or another user terminals), and then determine whether or not to process the new message as read after a desired (or alternatively, predefined) time elapses. For example, when determining that the user reads the message for a desired (or alternatively, predefined) time, it may maintain the message as read on the user terminal, and send a request to process a new message as read to the information processing system or another user terminal associated with another user. As another example, when determining that the user does not read the message for a desired (or alternatively, predefined time), it may cancel the processing of the message as read on the user terminal and classify the message as an unread message.

According to an example embodiment, with the user terminal having been in the chat room before receiving the new message (in this situation, the conversation content of the chat room is displayed on the user terminal), the read/unread determination unit 420 may maintain the new message as an unread message even when the new message is received and displayed on the display. For example, when a dynamic change of the user terminal is not detected after displaying a new message on the display, when the user sends a waiting message, when the user does not send a subsequent message, or when the user does not scroll the screen displaying the conversation content of the chat room by more than a desired (or alternatively, predefined) ratio, the new message may be maintained as an unread message. The dynamic change of the user terminal may be detected based on at least one of an image sensor, a gyro sensor, a proximity sensor, a touch sensor, or an illuminance sensor.

The waiting message send unit 430 may send a waiting message to another user through the chat room of the instant messaging application. The waiting message may be classified as a message of a different type from that of general messages, and may be treated/displayed differently from the general messages. For example, even when the user enters the chat room that includes the new message and sends a waiting message, the new message may be classified as an unread message. In addition, the waiting message may be displayed visually differently from the general messages on the user terminal and/or another user terminal associated with another user.

According to an example embodiment, the waiting message send unit 430 may send the waiting message in response to an input of a user requesting to send a waiting message. In another example embodiment, when the condition for automatically sending a waiting message is satisfied, the waiting message send unit 430 may automatically send the waiting message without an input of the user. For example, when the user does not enter the chat room within a desired (or alternatively, predefined) time, when there is a past conversation history with another user who sent a new message, and the like, the waiting message send unit 430 may automatically send the waiting message. The condition for automatically sending a waiting message may be set by the user. In an example embodiment, even when the condition for automatically sending a waiting message is satisfied, when the new message is determined to be an advertisement message, the waiting message may not be automatically sent, or the automatic sending of a waiting message may be canceled. Additionally, a new message determined to be an advertisement message may be processed as a read message.

The internal configuration of the processor 314 illustrated in FIG. 4 is only an example, and in some example embodiments, configurations other than the illustrated internal configuration may be additionally included, and some configurations may be omitted. For example, the new message determination unit 410 may be omitted, in which case the operation of sending a waiting message and/or the operation of determining whether or not to process a message as read may be performed by assuming that all newly received messages are new messages. As another example, the waiting message send unit 430 may be omitted, in which case the operation of sending a waiting message may be omitted, and the operation of determining whether or not to process a message as read may be performed. In addition, although the internal components of the processor 314 have been described separately for each function in FIG. 4, it does not necessarily mean that they are physically separated. Although the new message determination unit 410, the read/unread determination unit 420, and the waiting message send unit 430 have been separately described above, this is to help the understanding of the present inventive concepts, and example embodiments are not limited thereto.

Figure 5:
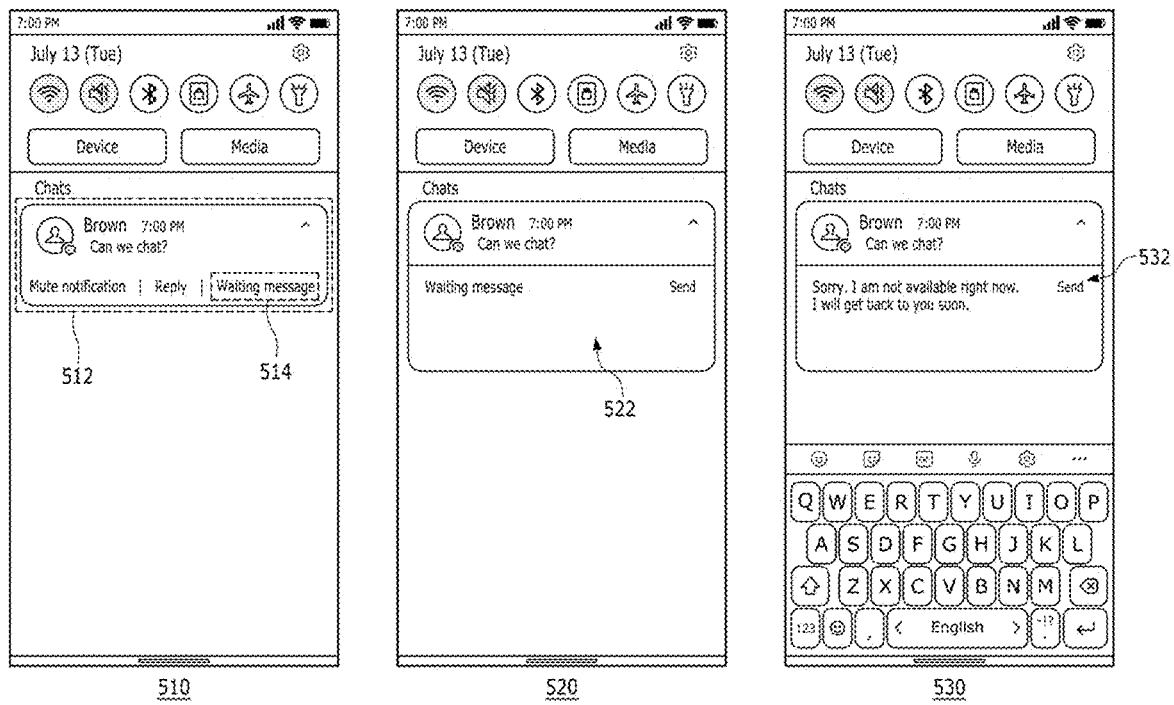
FIG. 5 is a diagram illustrating an example of sending a waiting message according to an example embodiment.

FIG. 5 is a diagram illustrating an example of sending a waiting message according to an example embodiment. As illustrated, the user may send a waiting message to another user (e.g., Brown) through first to third operations 510, 520, and 530. The first operation 510 illustrates an example in which the user selects a waiting message menu 514 while a new message received from another user is displayed in the form of a top bar notification 512 on the display of the user terminal. For example, the user may check that there is a new message received from Brown in the top bar notification 512 and select the waiting message menu 514 through a touch input or the like to send the waiting message without entering the chat room.

The second operation 520 illustrates an example in which a waiting message input field 522 is displayed on the screen in response to the user selecting the waiting message menu 514. In this case, the user may input a waiting message to be sent to another user in the waiting message input field 522. The third operation 530 illustrates an example in which the user inputs "Sorry. I am not available right now. I will get back to you soon.", which is a phrase to send to another user, in the waiting message input field 522. The user may select a "Send" button 532 through a touch input or the like to send the written waiting message to another user. In this case, the user terminal may send a request to send a waiting message including a recipient and the waiting message phrase to the information processing system. In another example, the user may select one of the waiting message templates displayed when the user selects the waiting message menu 514 to send a waiting message.

When the user sends the waiting message according to the procedure described above, a new message received from another user may be maintained as an unread message, and a mark indicating that there is an unread message may be maintained in the user terminal. For example, the top bar notification 512 and the like for notifying the reception of a new message may be maintained as it is. Additionally, another user terminal associated with another user may also display that the user does not read the new message. Although FIG. 5 illustrates that the new message received from another user is displayed in the form of the top bar notification 512, example embodiments are not limited thereto. For example, a new message received from another user may be displayed on the display in the form of a push notification.

Figure 6:
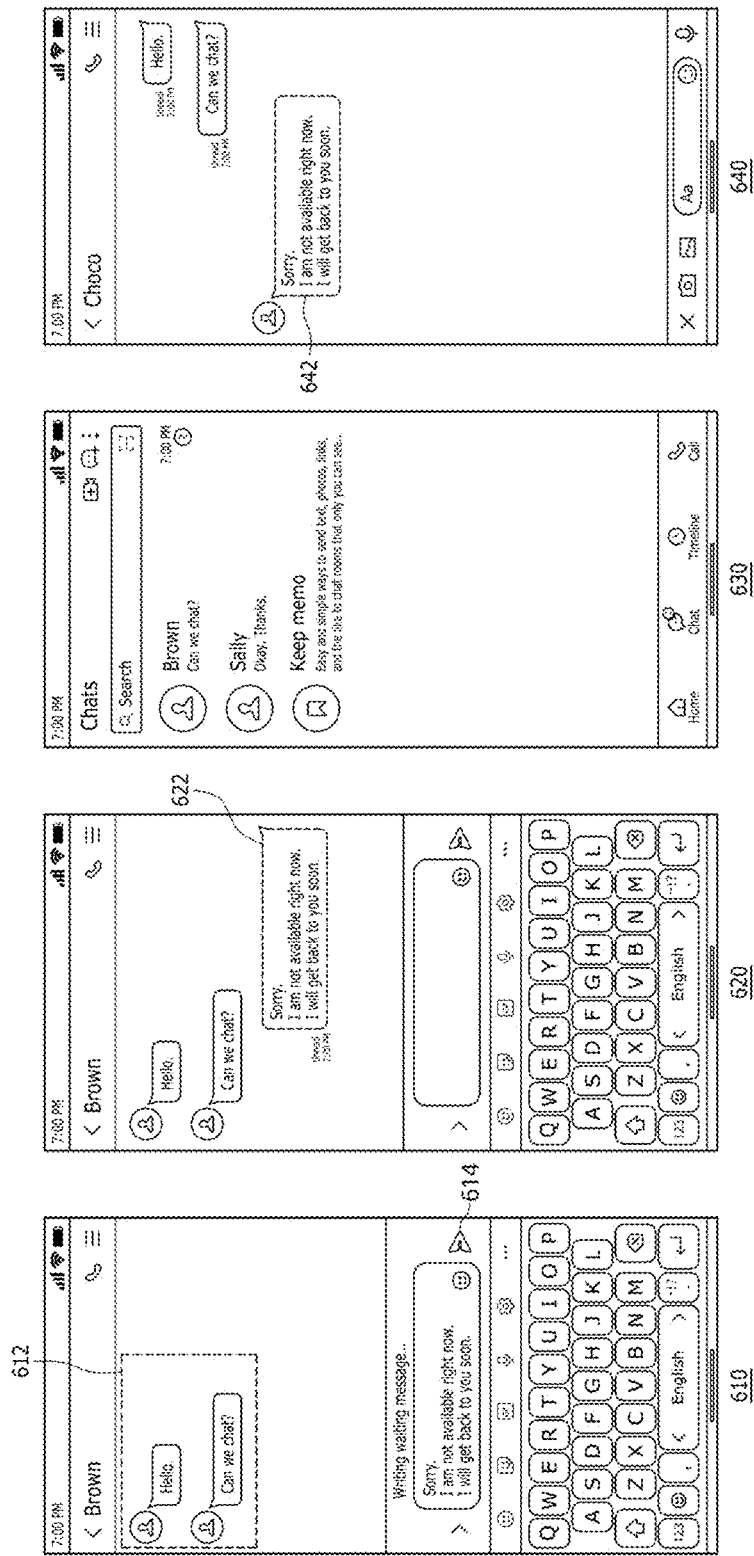
FIG. 6 is a diagram illustrating an example of sending a waiting message in a chat room according to an example embodiment.

FIG. 6 is a diagram illustrating an example of sending a waiting message in a chat room according to an example embodiment. As illustrated, the user may send a waiting message to another user (e.g., Brown) through first to fourth operations 610, 620, 630, and 640. The first operation 610 illustrates an example in which the user selects a waiting message as a message type in response to receiving a new message 612 from another user, and then creates a waiting message in the chat room. For example, when the user checks the new message 612 in the chat room that includes the user and another user together but it is difficult to respond immediately, the user may write a phrase such as "Sorry. I am not available right now. I will get back to you soon." and select a waiting message send button 614 through a touch input or the like to send the waiting message to another user. Alternatively, the user may select one of the waiting message templates to send the waiting message.

The second operation 620 illustrates a chat room screen displayed on the user terminal after the user sends a waiting message 622 to another user. As illustrated, the waiting message 622 may be displayed visually differently from the general messages. For example, an edge of the waiting message 622 may be displayed with a dotted line.

The third operation 630 illustrates an example in which the chat room list is displayed as the user leaves the chat room with another user (Brown). As illustrated, even when the user checks the new message, when the waiting message is sent, the new message may be maintained as an unread message, and a display indicating that there is an unread message may be maintained on the user terminal. For example, in the chat room list, the number of unread messages (e.g., number 2) displayed in the chat room to which the waiting message is sent may be maintained as it is.

The fourth operation 640 illustrates an example in which a waiting message 642 sent by the user from the user terminal of another user (Brown) is displayed on a display of another user terminal of the another user. As illustrated, even when the user checks the new message, when the waiting message is sent, the new message may be maintained as an unread message. For example, the phrase "unread" may be displayed together with the new message on the chat room screen. In addition, the waiting message 642 may be displayed visually differently from the general messages.

Additionally, when the user does not send a subsequent message within a desired (or alternatively, predefined) time (e.g., 6 hours, 1 day, and the like) after the user sends the waiting message to another user, the processor may display a guide associated with the new message on the display of the user terminal. For example, the processor may display the phrase "You have new message(s) that you have not answered yet since you sent waiting message" in the form of a push notification.

Figure 7:
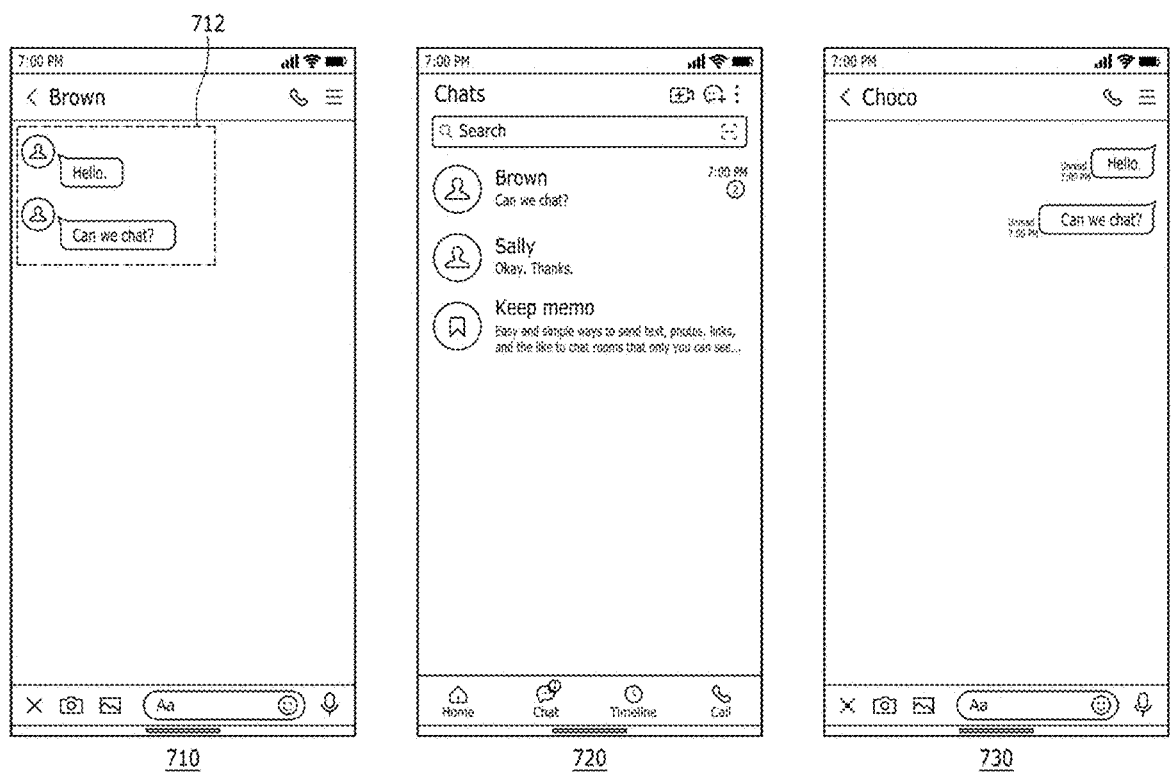
FIG. 7 is a diagram illustrating an example of maintaining a new message as an unread message according to an example embodiment.

FIG. 7 is a diagram illustrating an example of maintaining a new message as an unread message according to an example embodiment. As illustrated, when a specific condition is satisfied through first to third operations 710, 720, and 730, the new message may be maintained as an unread message. The first operation 710 illustrates an example in which the user receives a new message 712 from another user (e.g., Brown) and the new message 712 is displayed on the chat room screen. For example, the user may enter the chat room after the new message 712 is received, in which case the new message 712 may be displayed when the user enters the chat room, or the user may be already viewing the corresponding chat room screen when the new message 712 is received, in which case the new message 712 may be displayed on the display of the user terminal.

The second operation 720 illustrates an example in which the user leaves the chat room within a desired (or alternatively, predefined) time such that the new message 712 is maintained as an unread message. For example, the number of unread messages (e.g., number 2) displayed in the chat room on the chat room list screen may be maintained at it is. The third operation 730 illustrates an example displaying that the user ("Choco") does not read the new message, on another user terminal associated with another user ("Brown") who has sent the new message 712. For example, on the chat room screen of another user terminal, the phrase "unread" may be displayed together with the new message.

FIG. 7 illustrates that the new message 712 is maintained as an unread message when the user leaves the chat room within a desired (or alternatively, predefined) time after the new message 712 is received, but example embodiments are not limited thereto. For example, the user terminal may maintain the new message 712 as an unread message for a desired (or alternatively, predefined) time after the user enters the chat room. Additionally or alternatively, the user terminal may determine whether or not to process the message as read, based on an operation of the user or the user terminal for a desired (or alternatively, predefined) time. For example, the user terminal may maintain the new message 712 as an unread message when the user sends a waiting message, when a dynamic change of the user terminal is not detected, or when the user leaves the chat room within a desired (or alternatively, predefined) time. In this case, the dynamic change of the user terminal may be detected based on at least one of an image sensor, a gyro sensor, a proximity sensor, a touch sensor, and an illuminance sensor. Meanwhile, when the user sends a subsequent message to the new message 712 or when an advertisement message is determined, the user terminal may process the new message 712 as a read message.

Figure 8:
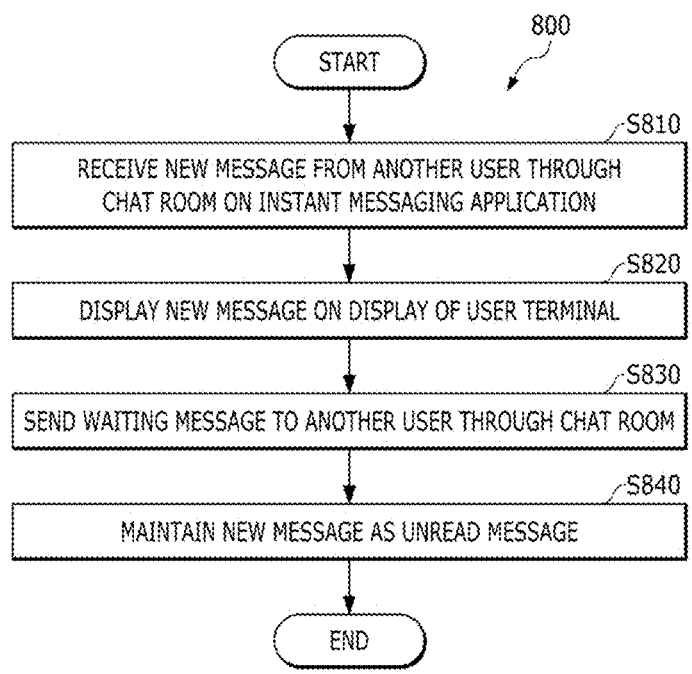
FIG. 8 is a flowchart illustrating a method for managing messages according to an example embodiment.

FIG. 8 is a flowchart illustrating a method for managing messages 800 according to an example embodiment. As illustrated, the method 800 may be initiated at S810 by one or more processors of the user terminal receiving a new message from another user through a chat room of an instant messaging application, and the processors may display the new message on the display of the user terminal, at S820. For example, in response to receiving the new message, the processor may display the new message on the display in a manner of displaying the number of new messages and/or the content of the latest new message in the chat room that includes the new message on the chat room list screen. As another example, the processor may display the new message in the form of a top bar notification, a push notification, or the like for notifying the reception of the new message, or in a manner of displaying the number of new messages on the icon of the instant messaging application. As still another example, the user terminal may display the content of the new message in the chat room when the user enters the chat room that includes the new message, or when the user was already in the chat room before receiving the new message.

In an example embodiment, the processor may send a waiting message to another user through the chat room, at S830. The waiting message may be displayed visually differently from the general messages on the user terminal and/or another user terminal associated with another user. In response to sending the waiting message, the processor may maintain the new message as an unread message, at S840. In addition, when the waiting message is sent, another user terminal associated with another user may display that the user does not read the new message.

In an example embodiment, the chat room list may be displayed on the display, and the waiting message may be sent based on a user selecting the chat room included in the chat room list. In another example embodiment, the new message may be displayed on the display in the form of a push notification, and the waiting message may be sent based on the user selecting a waiting message menu displayed together with the push notification. Additionally or alternatively, the user may select one of a plurality of waiting message templates to send the selected waiting message template to another user.

In an example embodiment, in response to determining that the user does not send a subsequent message in the chat room within a desired (or alternatively, predefined) time after sending the waiting message, the processor may display a guide associated with the new message on the display. For example, the processor may display the phrase "You have new message(s) that you have not answered yet since you sent waiting message" in the form of a push notification.

Figure 9:
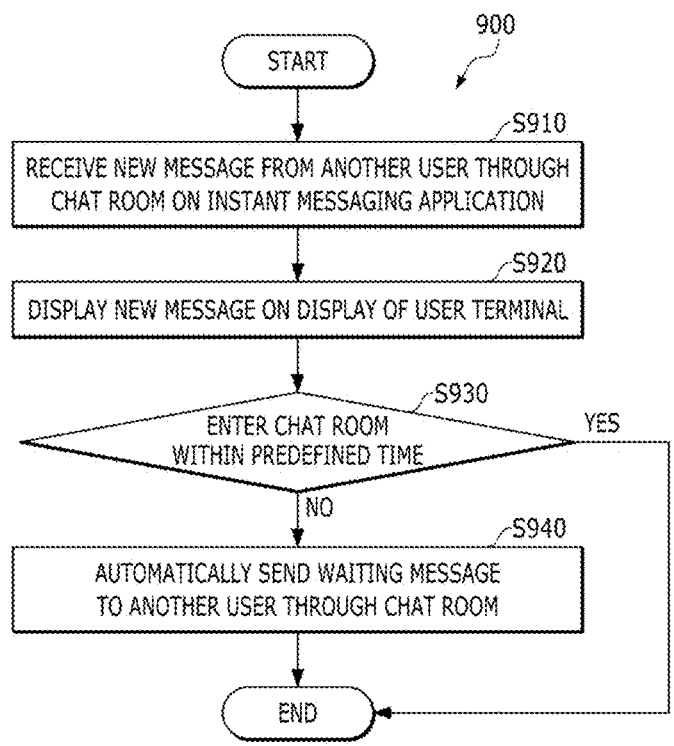
FIG. 9 is a flowchart illustrating a method for managing messages according to an example embodiment.

FIG. 9 is a flowchart illustrating a method 900 for managing messages according to an example embodiment. As illustrated, the method 900 may be initiated at S910 by one or more processors of the user terminal receiving a new message from another user through a chat room of an instant messaging application, and the processors may display the new message on the display of the user terminal, at S920. For example, in response to receiving the new message, the processor may display the new message on the display in a manner of displaying the number of new messages and/or the content of the latest new message in the chat room that includes the new message on the chat room list screen. As another example, the processor may display the new message in the form of a top bar notification, a push notification, or the like for notifying the reception of the new message, or in a manner of displaying the number of new messages on the icon of the instant messaging application.

Then, the processor may determine whether or not the user enters the chat room within a desired (or alternatively, predefined) time, at S930. In an example embodiment, when the user enters the chat room within the desired (or alternatively, predefined) time, the method 900 may end. In another example embodiment, when the user does not enter the chat room within the desired (or alternatively, predefined) time, the processor may automatically send a waiting message to the another user through the chat room, at S940. In this case, the waiting message may be automatically sent for all chat rooms, or the waiting message may be automatically sent for a chat room pre-specified by the user, or the waiting message may be automatically sent for a chat room satisfying a condition specified by the user. For example, when there is a past conversation history with another user, the waiting message may be automatically sent. Additionally or alternatively, when it is determined that the new message is an advertisement message, the processor may cancel the operation of automatically sending a waiting message and process the new message as a read message.

In an example embodiment, the processor may automatically send a waiting message when the user does not enter the chat room within a desired (or alternatively, predefined) time, when the new message is a message received after a desired (or alternatively, predefined) time elapses from the last message in the chat room, or when the new message is a message received after a desired (or alternatively, predefined) time elapses from the last message processed as a read message.

Figure 10:
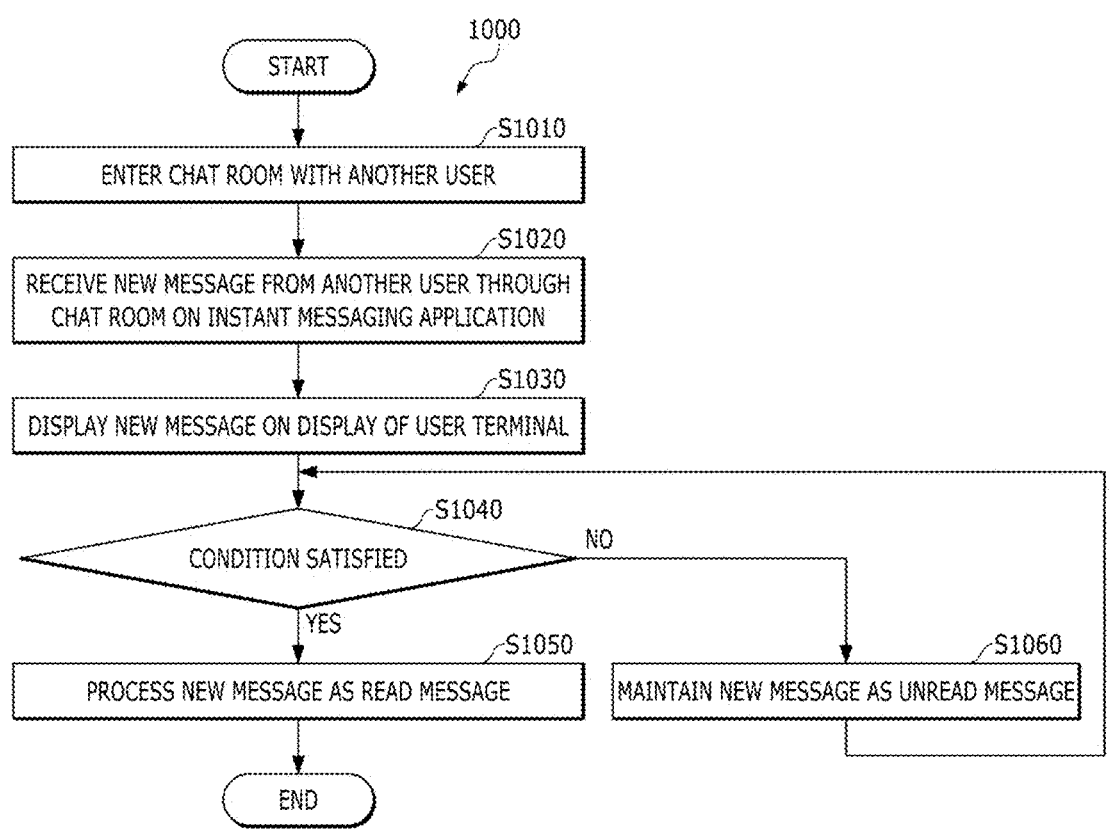
FIG. 10 is a flowchart illustrating a method for managing messages according to an example embodiment.

FIG. 10 is a flowchart illustrating a method 1000 for managing messages according to an example embodiment. The method 1000 may be initiated at S1010 when one or more processors of the user terminal enter a chat room with another user. Then, the processor may receive a new message from another user through the chat room of the instant messaging application, at S1020, and the processor may display the new message on the display of the user terminal, at S1030.

Then, at S1040, instead of directly processing the new message as read upon receiving the new message, the processor may determine whether or not to process the new message as read according to whether or not a specific condition is satisfied. In an example embodiment, when determining that the condition is not satisfied, the processor may maintain the new message as an unread message, at S1060. For example, in response to not detecting a dynamic change of the user terminal after displaying the new message on the display, the processor may maintain the new message as an unread message. In this case, the dynamic change of the user terminal may be detected based on at least one of an image sensor, a gyro sensor, a proximity sensor, a touch sensor, and an illuminance sensor. Additionally or alternatively, after displaying the new message on the display, the processor may maintain the new message as an unread message until the user sends a subsequent message in the chat room. In this case, the new message may be a message received after a desired (or alternatively, predefined) time elapsed from the last message in the chat room.

In an example embodiment, when determining that the condition is satisfied, the processor may process the new message as a read message, at S1050. For example, in response to the user scrolling a screen displaying the conversation content of the chat room by a desired (or alternatively, predetermined) ratio or more, the processor may process the new message as a read message. Additionally or alternatively, when it is determined that the new message is an advertisement message, the processor may process the new message as a read message even when the dynamic change of the user terminal is not detected.

FIGS. 8 to 10 illustrates that the sending of the waiting message, the automatic sending of the waiting message, and the processing of the new message as unread are respectively performed as separate procedures, but example embodiments are not limited thereto, and all or some of them may be used together.

According to the above example embodiments, a new massage could be maintained as an unread messages after a user sends out a waiting message to another user. Thus, significant computing resources are not needed to keep the new message as an unread message. Further, the new message or the chat room including the new message could be immediately recognized, without performing significant extra operations (e.g., without consuming significant computing resources), because the new message is maintained as an unread message, or the chat room is displayed with an indication that the user does not read the new message of the another user.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations. The processor described in this disclosure may be processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the example embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some example embodiments herein, various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method for managing messages on an instant messaging application, the method being executed by one or more processors of a user terminal associated with a user and comprising:
receiving a new message from another user through a chat room of the instant messaging application, the user and the another user belonging to the chat room;
displaying the new message on a display of the user terminal;
sending a waiting message to the another user;

displaying, in response to a first user input for requesting display of a user interface of the chat room, the user interface of the chat room and content of the new message in the chat room on the display of the user terminal, after sending the waiting message;

terminating, in response to a second user input for requesting to terminate the display of the user interface of the chat room, the display of the user interface of the chat room; and until the user sends a subsequent message to the new message in the chat room,
causing to maintain the new message on the display of the user terminal of the user and a display of another user terminal of the another user as an unread message, and
notifying the user of a presence of the new message that has not been read on the display of the user terminal.

2. The method according to claim 1, further comprising:
causing the waiting message to be displayed visually differently from a general message on the another user terminal associated with the another user,
wherein the waiting message is a different type of message than the general message in the instant messaging application.

3. The method according to claim 1, further comprising:
displaying a chat room list on the display,
wherein the sending includes sending the waiting message based on a user selecting a name of the chat room included in the chat room list.

4. The method according to claim 1, wherein
the displaying the new message on the display includes displaying the new message on the display of the user terminal in a form of a push notification, and
the sending includes sending the waiting message based on the user selecting a waiting message menu displayed together with the push notification.

5. The method according to claim 1, wherein the sending includes automatically sending the waiting message when the user does not enter the chat room within a first time period.

6. The method according to claim 5, wherein the sending includes automatically sending the waiting message when a past conversation history with the another user is present.

7. The method according to claim 5, further comprising:
when the new message is determined as an advertisement message,
deactivating the automatically sending the waiting message; and
processing the new message as a read message.

8. The method according to claim 1, wherein the sending comprises:
displaying a plurality of waiting message templates on the display;
selecting a waiting message template from among the plurality of waiting message templates by the user; and
sending the selected waiting message template to the another user in response to the selecting by the user.

9. The method according to claim 1, further comprising:
maintaining the new message as the unread message for a first time period from a time of entry into the chat room; and
during the first time period, causing the another user terminal associated with the another user to display that the user does not read the new message.

10. The method according to claim 9, wherein the new message is a message received after a second time period elapses from a last message in the chat room.

11. The method according to claim 1, further comprising:
in response to a third user input for requesting display of the user interface of the chat room, displaying the user interface of the chat room, before receiving the new message; and
in response to a dynamic change of the user terminal, after displaying the new message on the display, being not detected, maintaining the new message as the unread message.

12. The method according to claim 11, wherein the dynamic change of the user terminal is detected based on at least one of an image sensor, a gyro sensor, a proximity sensor, a touch sensor, or an illuminance sensor.

13. The method according to claim 11, further comprising:
when the new message is determined as an advertisement message, processing the new message as a read message.

14. The method according to claim 1, further comprising:
in response to a third user input for requesting display of the user interface of the chat room, displaying the user interface of the chat room, before receiving the new message; and
after displaying the new message on the display, maintaining the new message as the unread message until the user sends the subsequent message in the chat room.

15. The method according to claim 14, wherein the new message is a message received after a time period elapses from a last message in the chat room.

16. The method according to claim 1, further comprising:
entering the chat room before receiving the new message; and
processing the new message as a read message in response to a user scrolling a screen displaying a conversation content of the chat room by a ratio or more of a size of the display.

17. The method according to claim 1, further comprising:
in response to determining that the user does not send the subsequent message in the chat room within a time period after sending the waiting message, displaying a guide associated with the new message on the display.

18. A non-transitory computer-readable recording medium storing instructions, which when executed by one or more processors, cause a user terminal to perform the method according to claim 1.

19. A user terminal, comprising:
a display;
a memory; and
one or more processors connected to the memory and configured to execute one or more computer-readable programs included in the memory such that the user terminal is configured to,
receive a new message from another user through a chat room of an instant messaging application a user of the user terminal and the another user belonging to the chat room,
display the new message on the display,
send a waiting message to the another user,
after sending the waiting message, enter the chat room,
display, in response to a first user input for requesting display of a user interface of the chat room, the user interface of the chat room and content of the new message in the chat room on the display of the user terminal, after sending the waiting message, terminate, in response to a second user input for requesting to terminate the display of the user interface of the chat room, the display of the user interface of the chat room, and until the user sends a subsequent message to the new message in the chat room, cause to maintain the new message on the display of the user terminal of the user and a display of another user terminal of the another user as an unread message, and notify the user of a presence of the new message that has not been read on the display of the user terminal.

\* \* \* \* \*